(12) United States Patent
Minaai et al.

(10) Patent No.: US 6,309,733 B1
(45) Date of Patent: Oct. 30, 2001

(54) GLASS PANEL

(75) Inventors: Tetsuo Minaai, Muko; Michihiro Kato, Amagasaki; Masashi Kikuta, Nishinomiya, all of (JP)

(73) Assignee: Nippon Sheet Glass Co., LTD, Osaka (JP)

( * ) Notice: Subject to any disclaimer, the term of this patent is extended or adjusted under 35 U.S.C. 154(b) by 0 days.

(21) Appl. No.: 09/462,193
(22) PCT Filed: May 17, 1999
(86) PCT No.: PCT/JP99/02571
§ 371 Date: Jan. 3, 2000
§ 102(e) Date: Jan. 3, 2000
(87) PCT Pub. No.: WO99/59931
PCT Pub. Date: Nov. 25, 1999

(30) Foreign Application Priority Data

May 19, 1998 (JP) .................................................. 10-136344

(51) Int. Cl.⁷ ..................................................... B32B 23/02
(52) U.S. Cl. .......................... 428/192; 428/200; 428/34.6; 428/58; 428/630
(58) Field of Search .................................... 428/192, 200, 428/621, 630, 33, 34.4, 34.6, 40.4, 57, 58

(56) References Cited

FOREIGN PATENT DOCUMENTS

6087633 * 3/1994 (JP) .

OTHER PUBLICATIONS

JP, 06–087633, A. (Kazuo Kuroiwa), Mar. 29, 1994.

* cited by examiner

Primary Examiner—Merrick Dixon
(74) Attorney, Agent, or Firm—Fulbright & Jaworski, LLP

(57) ABSTRACT

A glass panel in which spacing members (2) are interposed between a pair of glass sheets (1A, 1B) and a heat-fusible outer periphery sealing portion is provided along the entire outer periphery of the two glass sheets (1A, 1B) for sealing the space (V) between the glass sheets (1A, 1B) under a pressure-reduced condition. A linear expansion coefficient ($\alpha_1$) of one (1A) of the glass sheets (1A, 1B) and a linear expansion coefficient ($\alpha_2$) of the other glass sheet (1B) are set within a range which satisfies a predetermined relation expression.

2 Claims, 3 Drawing Sheets

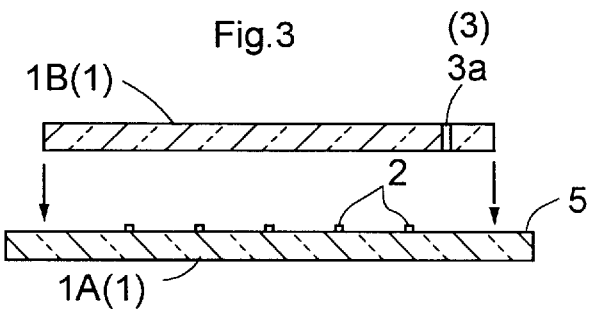
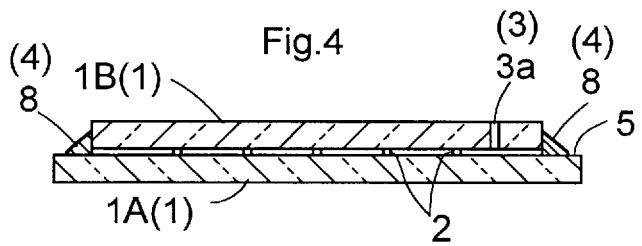
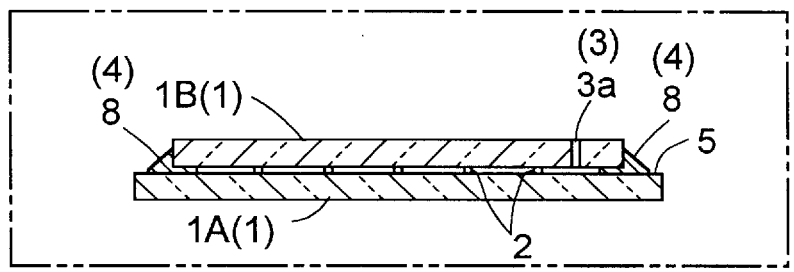
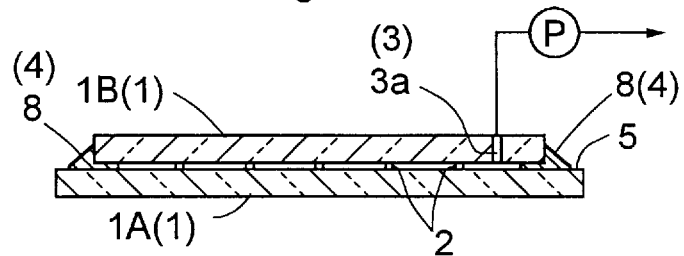
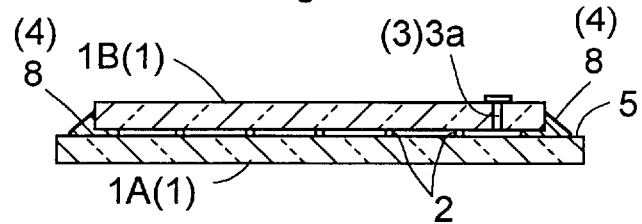

GLASS PANEL

TECHNICAL FIELD

The present invention relates to a glass panel in which spacing members are interposed between a pair of glass sheets and a heat-fusible outer periphery sealing portion is provided along the entire outer periphery of the two glass sheets for sealing the space between the glass sheets under a pressure-reduced condition.

BACKGROUND ART

As a glass sheet having a higher heat insulating performance than a pair of glass sheets, there is known a double glazing comprising a pair of glass sheets combined together with an air layer acting as a heat insulating layer being interposed therebetween. However, this type of glass panel suffers the problem of its own significant thickness which tends to deteriorate the aesthetic appearance including that of a sash. Then, in order to achieve a higher heat insulating performance with a smaller thickness, there has been proposed a glass panel in which a plurality of spacing members are interposed between a pair of glass sheets and a heat-fusible outer periphery sealing portion (e.g. low-melting glass) is provided along the entire outer periphery of the two glass sheets for sealing the space between the glass sheets under a pressure-reduced condition, so that the glass panel may be formed thinner, yet have a lower heat transmission coefficient.

And, for forming the outer periphery sealing portion, paste of low-melting glass is disposed at the outer peripheral edges of the two glass sheets and then heated above the fusing point of the low-melting glass, so that fused low-melting glass is caused to extend over between the outer peripheral edges of the two glass sheets. Then, the temperature is returned to the normal temperature to solidify the low-melting glass, so that this solidified low-melting glass forms the outer periphery sealing portion.

According to a conventional glass panel of the above-noted type, it has been proposed to employ a same kind of glass sheets (e.g. float glass) as the pair of glass sheets or to employ a wire glass as one of the glass sheets in case the panel is to be used in a fire retarding area.

However, the above-described conventional glass panel suffers the following problem.

Namely, the formation of the outer periphery sealing portion requires elevating of the atmosphere temperature of the glass panel and then returning the temperature to the normal temperature, as described above. In the course of this, each of the pair of glass sheets is expanded and contracted, depending on the atmosphere temperature. Such expansion and contraction of glass sheet is affected by its coefficient of linear expansion. For instance, if the coefficients of linear expansion of the pair of glass sheets are different from each other, when the atmosphere temperature is elevated, the amount of expansion will be greater in the glass sheet having the greater linear expansion coefficient.

On the other hand, when the atmosphere temperature is returned to the normal temperature, both of the glass sheets will be contracted respectively to their original dimensions.

When the outer peripheral edges of the pair of glass sheets are joined together at the outer periphery sealing portion, this operation is effected under the atmosphere of the elevated temperature. Hence, the two glass sheets will be combined together while they keep the different amounts of expansion therein. Then, as the atmosphere temperature gradually returns to the normal temperature, the glass sheet having the higher linear expansion coefficient will be contracted more than the other glass sheet.

As a result, the difference between the contraction amounts of the two glass sheets will appear as a flexion, whereby the glass panel may be warped. If the amount of flexion is significant, the glass panel may be broken due to the atmospheric pressure when the inside thereof is pressure-reduced.

With the conventional glass panel described above, if different kinds of glass sheets are employed as the pair of glass sheets, the two glass sheets may be warped and broken. Or, even when they are not broken, a significant internal stress will remain within the two glass sheets, so that a required strength cannot be obtained.

An object of the present invention is to solve the above problem by providing a glass panel comprised of glass sheets having different expansion coefficients, with which panel an appropriate strength may be readily obtained and which functions stably for a long period of time in spite of the pressure-reduced inside thereof.

DISCLOSURE OF THE INVENTION

The characterizing features of a glass panel relating to the present invention will be described next.

According to a glass panel relating to claim 1, as shown in FIG. 1, in a glass panel in which spacing members are interposed between a pair of glass sheets and a heat-fusible outer periphery sealing portion is provided along the entire outer periphery of the two glass sheets for sealing the space between the glass sheets under a pressure-reduced condition, a linear expansion coefficient ($\alpha_1$) of one of the glass sheets and a linear expansion ($\alpha_2$) coefficient of the other glass sheet are set within a range which satisfies the following relationship; namely, $$(\alpha_1 - \alpha_2) \times \Delta T \leq 6 \times 10^{-5} \qquad (1)$$

where $\alpha_1 > \alpha_2$ $\alpha_1$: the linear heat expansion coefficient of one glass sheet (/° C.)

$\alpha_2$: the linear heat expansion coefficient of the other glass sheet (/° C.)

$\Delta T$: (solidification temperature of the outer periphery sealing portion—environmental temperature at which the glass panel is to be used) (/° C.).

According to the above construction, of the pair of glass sheets, the linear expansion coefficient of one glass sheet and the linear expansion coefficient of the other glass sheet are set within a range which satisfies the expression (1). Hence, even if warping may develop in the two glass sheets due to a change in the atmosphere temperature in the step of forming the outer periphery sealing portion, it is possible to restrict occurrence of excessive residual internal stress in the two glass sheets. As a result, it becomes possible to prevent such inconvenience that the glass sheet is broken in the step of forming the glass panel, especially when the inside thereof is pressure-reduced or significant internal stress remains in the two glass sheets, so that the glass panel may be broken when subjected to only small external force.

Consequently, an appropriate strength for a glass panel may be readily assured, and also the yield of the glass material or the like employed in the manufacture of the glass panel may be improved.

Incidentally, for obtaining the above expression (1), a plurality of glass panels were made from various combinations of glass sheets having different linear expansion coefficients and these were subjected to experiments in which the atmosphere temperature was varied. And, based on the amounts of warp developed in these glass panels, the appropriate stress condition was determined, from which the expression was derived.

According to the present invention relating to claim 2, in a glass panel in which spacing members are interposed between a pair of glass sheets and a heat-fusible outer periphery sealing portion is provided along the entire outer periphery of the two glass sheets for sealing the space between the glass sheets under a pressure-reduced condition, a linear expansion coefficient ($\alpha1$) of one of the glass sheets and a linear expansion ($\alpha2$) coefficient of the other glass sheet are set within a range which satisfies the following relationship; namely, $$\{(\alpha_1 \times L_1 - \alpha_2 \times L_2) \times \Delta T\}/L_1 \leq 6 \times 10^{-5} \quad (2)$$

where $\alpha_1 > \alpha_2$ $\alpha_1$: the linear heat expansion coefficient of one glass sheet (/° C.)

$\alpha_2$: the linear heat expansion coefficient of the other glass sheet (/° C.)

$L_1$: the length of the one glass sheet (m)

$L_2$: the length of the other glass sheet (m)

$\Delta T$: (solidification temperature of the outer periphery sealing portion—environmental temperature at which the glass panel is to be used) (° C.).

With the above construction, of the pair of glass sheets, the linear expansion coefficient of one glass sheet and the linear expansion coefficient of the other glass sheet are set within a range which satisfies the expression (2). Hence, even when the length of the one glass (inner distance between the glass sheet portions contacting respectively the outer periphery sealing portions at the opposed ends) and the length of the other glass (inner distance between the glass sheet portions contacting respectively the outer periphery sealing portions at the opposed ends) are different from each other, it becomes possible to restrict excessive residual internal stress from acting on the two glass sheets due to warping thereof caused by a change in the atmosphere temperature during the step of forming the outer periphery sealing portion. As a result, it becomes possible to prevent such inconvenience that the glass sheet is broken in the step of forming the glass panel or significant internal stress remains in the two glass sheets, so that the glass panel may be broken when subjected to only small external force. Consequently, an appropriate strength for a glass panel may be readily assured, and also the yield of the glass material or the like employed in the manufacture of the glass panel may be improved.

Incidentally, for obtaining the above expression (2), a plurality of glass panels were made from various combinations of glass sheets having different linear expansion coefficients and these were subjected to experiments in which the atmosphere temperature was varied. And, based on the amounts of warp developed in these glass panels, the appropriate stress condition was determined, from which the expression was derived.

BRIEF DESCRIPTION OF THE DRAWINGS

FIGS. 3 through 7 are views illustrating the process of forming the glass panel under the atmospheric pressure environment.

BEST MODES FOR EMBODYING THE INVENTION

Next, embodiments of the present invention will be described with reference to the accompanying drawings.

(Construction of Glass Panel)

Figure 1:
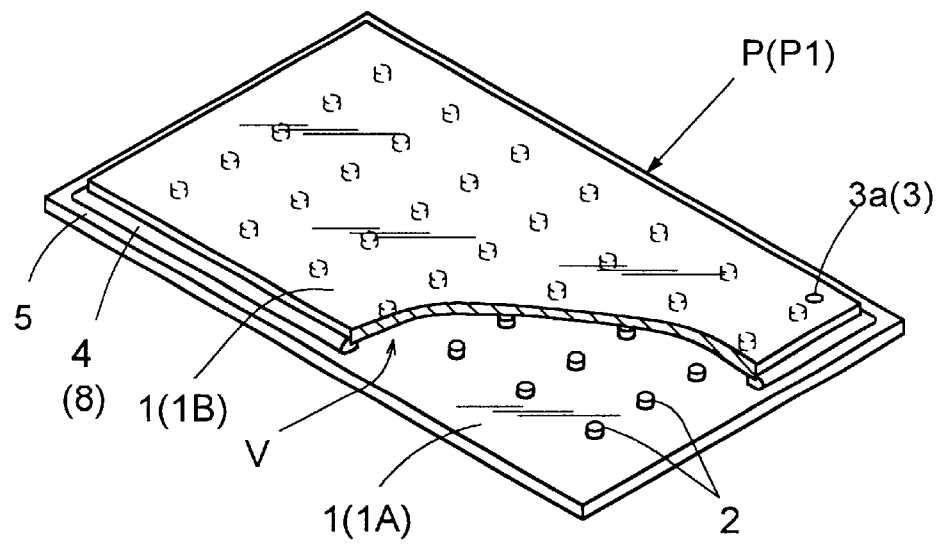
FIG. 1 is a partially cutaway perspective view showing a glass panel.
Figure 2:
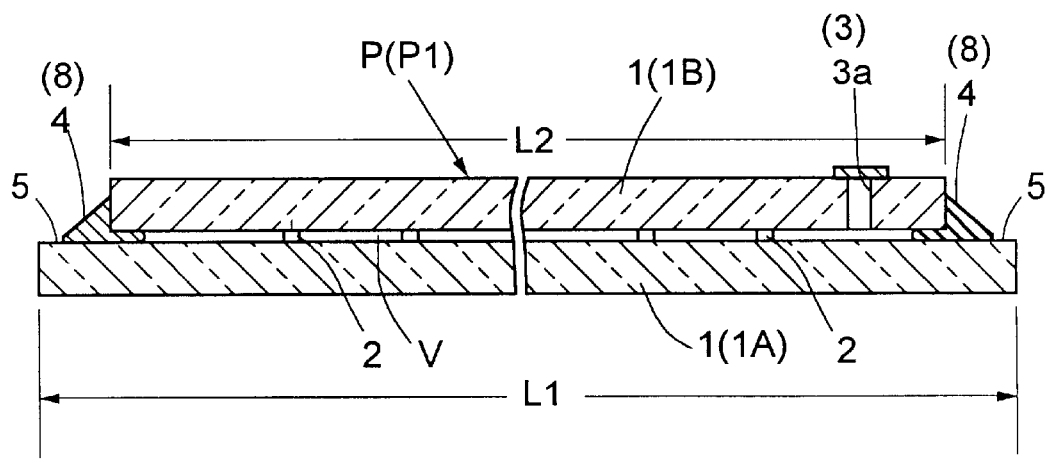
FIG. 2 is a section view of the glass panel.

FIGS. 1 and 2 show a glass panel according to one embodiment of the present invention.

This glass panel P includes a glass panel body P1 formed by interposing a plurality of spacers 2 (corresponding to the spacing members) between a pair of glass sheets 1 (float glass sheets) along the sheet faces and a space V between the one glass sheet 1A and the other glass sheet 1B is pressure-reduced and sealed.

For instance, suppose the one glass sheet 1A of the pair of glass sheets 1 is comprised of a wire glass sheet having a thickness of 6.8 mm (substantially 6.2 to 7.4 mm when a thickness error thereof is considered) and the other glass sheet 1B is comprised of a transparent float glass sheet having a thickness of 3 mm (substantially 2.5 to 3.5 mm when a thickness error thereof is considered) (corresponding to a specimen No. 11 identified in Table 1 described later). Such glass panel P using a wire glass sheet as one glass sheet 1A is used for forming a fire-retarding division, for instance.

The length $L_1$ of the one glass sheet 1A and the length $L_2$ of the other glass sheet 1B are both set at about 2.1 m. The coefficient $\alpha_1$ of linear expansion of the one glass sheet 1A is $89.1 \times 10^{-7}/°$ C., and the coefficient $\alpha_2$ of linear expansion of the other glass sheet 1B is $88.4 \times 10^{-7}/°$ C. And, along the entire outer peripheral edges of the two glass sheets 1A and 1B, a sealing portion 4 (corresponding to the heat-fusible outer periphery sealing portion) is formed by using a low-melting glass (e.g. solder glass) so as to seal the space V.

The space V is rendered into the pressure-reduced condition (below $1.0 \times 10^{-2}$ Torr) by e.g. manufacturing the glass panel body P1 under a vacuum environment or by evacuating air from the space V after the manufacture of the glass panel body P1.

In the latter case of evacuating after the manufacture of the glass panel, however, it is necessary to form in advance an evacuating portion 3 for pressure-reducing and sealing the space V between the two glass sheets 1 in one glass sheet 1B (or 1A) of the pair of glass sheets 1A, 1B or in the sealing portion 4.

Incidentally, the outer peripheral edges of the two glass sheets 1A, 1B are formed so that one glass sheet 1A projects in the direction of sheet face. By forming this projecting portion 5, during the formation of the sealing portion 4, the outer periphery of the space V may be sealed efficiently and reliably while the sealing material (e.g. low-melting glass) is placed on this projecting portion 5.

The spacer 2 is made of stainless steel and formed in a cylindrical shape. And, it is sized in the diameter of 0.30 to 1.00 mm and the height of 0.1 to 0.5 mm. By forming its portion contacting the two glass sheets 1A, 1B in the cylindrical shape like this construction, angular portion which tends to invite stress concentration to the two glass sheets 1A, 1B is not formed, thus making the two glass sheets 1A, 1B less breakable.

On the other hand, the spacers 2 are disposed with the spacing of 10 to 25 mm with each other.

Incidentally, the combination of the two glass sheets 1A, 1B constituting the glass panel P is not limited to the particular combination of the glass sheet having the thickness of 6.8 mm and the glass sheet having the thickness of 3 mm described in the foregoing embodiment. Combinations of glass sheets of other thickness may be employed also.

(Manufacturing Method of Glass Panel)

The glass panel P relating to the present invention may be manufactured by using various methods. First, there will be described a method for forming the glass panel P under the atmospheric pressure environment.

[1] As shown in FIG. 3, the spacers 2 are placed at predetermined positions on the one glass sheet 1A.

[2] On this one glass sheet 1A, as illustrated in FIG. 4, the other glass sheet 1B is superposed, and also the sealing portion forming low-melting glass 8 (having the melting point of 320 to 390° C.) is placed on the projecting portion 5. Alternatively, after the sealing portion forming low-melting glass 8 is applied to the projecting portion 5 and then dried sufficiently, the other glass sheet 1B is superposed thereon.

In the instant embodiment, in the other glass sheet 1B, an evacuating opening 3a as the evacuating portion 3 is formed in advance.

[3] These two glass sheets 1A, 1B are heated (the atmosphere temperature of about 500° C.) to fuse the sealing portion forming low-melting glass 8. Thereafter, they are cooled to the normal temperature (20° C. in the instant embodiment), whereby the sealing portion forming low-melting glass 8 is solidified to form the sealing portion (see FIG. 5).

[4] After the air of the space V is drawn through the evacuating hole 3a, the evacuating portion is sealed, whereby the glass panel P is formed (see FIG. 6 and FIG. 7).

Alternatively, the glass panel P relating to the present invention may be manufactured also under a pressure-reduced environment as described below.

Figure 8:
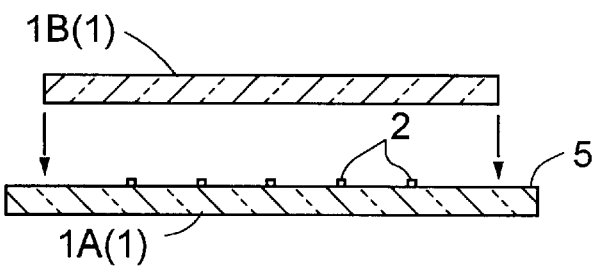
FIGS. 8 through 11 are views illustrating the process of forming the glass panel under a pressure-reduced environment.

[1] First, the spacers 2 are disposed at predetermined positions on the one glass sheet 1A, as illustrated in FIG. 8.

Figure 9:
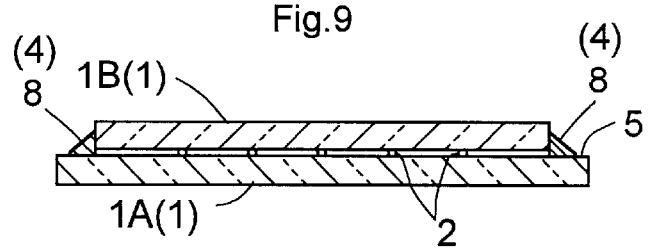

[2] As shown in FIG. 9, under the pressure-reduced environment (e.g. inside a vacuum furnace), the sealing portion forming low-melting glass 8 (having the melting point of 320 to 390° C.) is applied to the projecting portion 5 of the one glass sheet 1A and then the other glass sheet 1B is superposed thereon. In this case, there is no need of providing the evacuating hole 3a in the other glass sheet 1B in advance.

Figure 10:
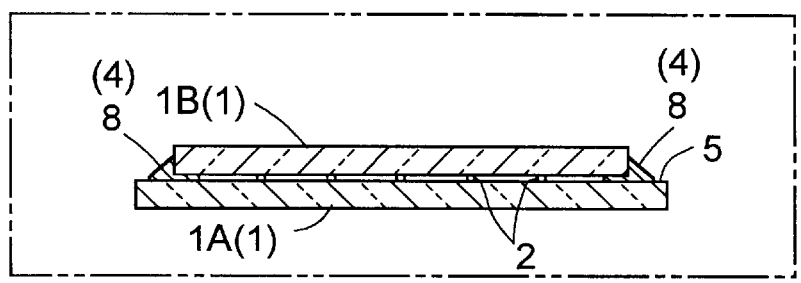
Figure 11:
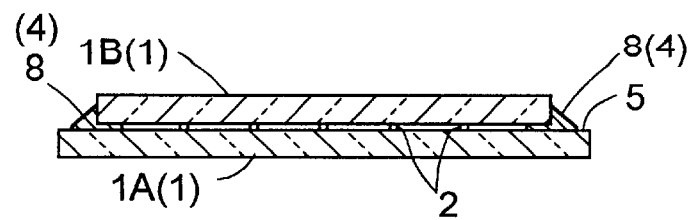

[3] Further, as illustrated in FIG. 10, the two glass sheets 1A, 1B are heated (up to the atmosphere temperature of about 500° C.) to fuse the sealing portion forming low-melting glass 8 and then cooled to the normal temperature (20° C. in this embodiment). Whereby, the sealing portion forming low-melting glass 8 is solidified to form the sealing portion. With the above-described process, there is formed the glass panel P having the pressure-reduced space V, as shown in FIG. 11.

(Evaluation of Glass Panels)

Normally, if the linear expansion coefficients of the two glass sheets 1A, 1B are different from each other, when the two glass sheets 1A, 1B are cooled from the elevated temperature condition to the normal temperature condition in order to form the sealing portion 4, there is developed a difference of the contraction amounts in the two glass sheets 1A, 1B. And, this difference results in such inconvenience as warping or breakage of the glass panel P.

However, according to the glass panel P relating to the present invention, although the panel comprises the combination of glass sheets 1A, 1B having different linear expansion coefficients from each other, the panel is constructed so as to satisfy the above-described expression (1) or expression (2). Hence, increase of the internal stress is avoided and occurrence of such convenience is prevented.

The requirement to satisfy the relationship of the expression (1) or expression (2) was determined, based on the evaluation tests conducted with using a plurality of glass panels P. The results thereof are shown in Table 1 below.

TABLE 1

Results of Evaluation Tests of Glass Panels

| test specimens | coefficient of linear expansion $\times 10^{-7}/°$ C. | | length of glass sheet m | | thickness of glass sheet mm | | temperature difference ° C. $\Delta T$ | value of left-side of expression (1), (2) $\times 10^{-5}$ | evaluation |
|---|---|---|---|---|---|---|---|---|---|
| | the one $\alpha_1$ | other $\alpha_2$ | the one $L_1$ | other $L_2$ | the one $d_1$ | other $d_2$ | | | |
| 1 | 93.0 | 88.4 | 2.1 | 2.1 | 3.0 | 3.0 | 300 | 13.8 | broken |
| 2 | 93.0 | 88.4 | 1.0 | 1.0 | 3.0 | 3.0 | 300 | 13.8 | broken |
| 3 | 90.7 | 88.4 | 2.1 | 2.1 | 6.8 | 3.0 | 300 | 6.9 | broken |
| 4 | 90.7 | 88.4 | 1.0 | 1.0 | 6.8 | 3.0 | 300 | 6.9 | broken |
| 5 | 93.0 | 88.4 | 2.1 | 2.1 | 3.0 | 3.0 | 200 | 9.2 | broken |
| 6 | 93.0 | 88.4 | 1.0 | 1.0 | 3.0 | 3.0 | 200 | 9.2 | broken |
| 7 | 88.4 | 86.4 | 2.1 | 2.1 | 6.8 | 3.0 | 300 | 6.0 | good |
| 8 | 88.4 | 86.4 | 1.0 | 1.0 | 6.8 | 3.0 | 300 | 6.0 | good |
| 9 | 88.4 | 87.8 | 2.1 | 2.1 | 6.8 | 3.0 | 300 | 1.8 | good |
| 10 | 88.4 | 87.8 | 1.0 | 1.0 | 6.8 | 3.0 | 300 | 1.8 | good |
| 11 | 89.1 | 88.4 | 2.1 | 2.1 | 6.8 | 3.0 | 300 | 2.1 | good |
| 12 | 89.1 | 88.4 | 1.0 | 1.0 | 6.8 | 3.0 | 300 | 2.1 | good |
| 13 | 90.7 | 88.4 | 2.1 | 2.1 | 6.8 | 3.0 | 200 | 4.6 | good |
| 14 | 90.7 | 88.4 | 1.0 | 1.0 | 6.8 | 3.0 | 200 | 4.6 | good |
| 15 | 90.7 | 88.4 | 2.1 | 2.1 | 6.8 | 4.0 | 300 | 6.9 | poor |
| 16 | 90.7 | 88.4 | 2.1 | 2.1 | 6.8 | 5.0 | 300 | 6.9 | poor |
| 17 | 90.7 | 88.4 | 2.1 | 2.1 | 6.8 | 6.0 | 300 | 6.9 | poor |
| 18 | 93.0 | 88.4 | 2.1 | 2.1 | 3.0 | 3.0 | 300 | 13.8 | broken |
| 19 | 93.0 | 88.4 | 2.1 | 2.1 | 3.0 | 4.0 | 300 | 13.8 | broken |

TABLE 1-continued

Results of Evaluation Tests of Glass Panels

| test specimens | coefficient of linear expansion × $10^{-7}$/° C. | | length of glass sheet m | | thickness of glass sheet mm | | temperature difference ° C. | value of left-side of expression | evaluation |
|---|---|---|---|---|---|---|---|---|---|
| | one $\alpha_1$ | other $\alpha_2$ | one $L_1$ | other $L_2$ | one $d_1$ | other $d_2$ | $\Delta T$ | (1), (2) × $10^{-5}$ | |
| 20 | 93.0 | 88.4 | 2.1 | 2.1 | 3.0 | 5.0 | 300 | 13.8 | broken |
| 21 | 93.0 | 88.4 | 2.1 | 2.1 | 3.0 | 6.0 | 300 | 13.8 | broken |
| 22 | 93.0 | 88.4 | 2.1 | 2.1 | 5.0 | 5.0 | 300 | 13.8 | broken |
| 23 | 93.0 | 88.4 | 2.1 | 2.1 | 4.0 | 6.0 | 300 | 13.8 | broken |
| 24 | 90.5 | 88.4 | 2.1 | 2.1 | 3.0 | 3.0 | 300 | 6.3 | poor |
| 25 | 90.5 | 88.4 | 2.1 | 2.1 | 4.0 | 4.0 | 300 | 6.3 | poor |
| 26 | 90.5 | 88.4 | 2.1 | 2.1 | 5.0 | 5.0 | 300 | 6.3 | poor |
| 27 | 90.5 | 88.4 | 2.1 | 2.1 | 6.0 | 6.0 | 300 | 6.3 | poor |
| 28 | 89.6 | 88.4 | 2.1 | 2.1 | 3.0 | 3.0 | 300 | 3.6 | good |
| 29 | 89.6 | 88.4 | 2.1 | 2.1 | 3.0 | 4.0 | 300 | 3.6 | good |
| 30 | 89.6 | 88.4 | 2.1 | 2.1 | 3.0 | 5.0 | 300 | 3.6 | good |
| 31 | 89.6 | 88.4 | 2.1 | 2.1 | 5.0 | 3.0 | 300 | 3.6 | good |
| 32 | 89.6 | 88.4 | 2.1 | 2.1 | 5.0 | 5.0 | 300 | 3.6 | good |

In the above, $\alpha_1$ is the linear heat expansion coefficient of one glass sheet 1A, and $\alpha_2$ is the linear heat expansion coefficient of the other glass sheet 1B. $L_1$ is the length of the one glass sheet 1A, and $L_2$ is the length of the other glass sheet 1B. $d_1$ is the thickness of the one glass sheet 1A and $d_2$ is the thickness of the other glass sheet 1B. $\Delta T$ is the temperature difference between the solidification temperature of the sealing portion and the environmental temperature at which the glass panel P is to be used. Incidentally, the solidification temperature of the sealing portion was 320° C. and the environmental temperature at which the glass panel P was to be used (corresponding to the normal temperature) was 20° C.

The evaluations were made such that the specimens in which the internal stress of the two glass sheets 1A, 1B under the warped condition remained within the long-term permissible stress range were evaluated as "good", those in which the stress exceeded the long-term permissible stress range were evaluated as "poor", and those that were broken during the cooling process from the elevated temperature condition to the normal temperature condition or during the process of evacuating the space V were evaluated as "broken", respectively. Incidentally, the internal stresses of the glass sheets were calculated from the amounts of warp developed in the glass panels P.

From the results of Table 1, it may be seen that a good glass panel P may be obtained when the value of the left-side of the expression (1) or (2) is below 6×$10^{-5}$.

That is to say, if the glass panel satisfies the condition of expression (1) or (2), even when the internal stress in either glass sheet is increased, the degree of this increase will be confined within the long-term permissible stress range of the two glass sheets 1A, 1B. Thus, even when the space V is pressure-reduced, the glass panel P may maintain its strength for an extended period of time.

Incidentally, Table 1 shows only the thickness conditions of the two glass sheets 1A, 1B. However, in the consideration of the possibility of e.g. breakage of the glass panel P, it is believed that the thickness of the glass sheets will not be a significant factor.

For instance, referring to the group of the specimens Nos. 28 to 32, the linear expansion coefficients $\alpha_1$, $\alpha_2$, the lengths $L_1$, $L_2$ of the glass sheets, and the temperature difference $\Delta T$ between the solidification temperature of the sealing portion and the environmental temperature at which the glass panel P is to be used were all set the same and these only differed in the condition of the glass sheet thickness $d_1$, $d_2$. However, the 10 evaluation results of Nos. 28 through 32 were all good.

Similarly, in the case of the group of the specimens Nos. 18–23 and the further group of the specimens Nos. 24–27, they were different only in the condition of the glass sheets thickness $d_1 \cdot d_2$. But, the evaluation results of each of these groups were all the same.

That is to say, without consideration to the thickness of the glass sheets constituting the glass panel P, the evaluation of a glass panel is still possible if the left-side value of the expression (1) or the expression (2) is considered.

Other Embodiments

<1> In the foregoing embodiment, a wire glass sheet and a float glass sheet are employed. Any other type of glass may be employed if desired. For instance, it may be figured glass, frosted glass (glass provided through a surface treatment thereof with the function of diffusing light), tempered glass, plate glass provided with the function of heat absorption, ultraviolet absorption, heat reflection or the like, or any combinations of these.

Further, as for the composition of the glass, it may be sodium silicate glass (soda lime silica glass), boric silicate glass, or various kinds of crystallized glass.

<2> The glass sheets are not limited to those in which the first glass sheet 1A and the second glass sheet 1B have different lengths or widths. Instead, the glass sheets may be of same dimensions. And, the superposing manner of the first glass sheet 1A and the second glass sheet 1B may alternatively be such that the peripheral edges thereof are superposed in alignment with each other.

<3> In the foregoing embodiment, the low-melting glass 8 is employed for the sealing portion 4. Instead, various kinds of metal such as metal solder may be employed for sealing the end edges of the two glass sheets 1A, 1B. Further, the sealing may be done by fusing at least one of the two glass sheets 1A, 1B, or any other glass than the low-melting glass may be employed for the sealing.

<4> The spacing member is not limited to the spacer made of stainless steel described in the foregoing embodiment. Instead, it may be made of inconel alloy 718, or any other metallic, crystal glass · ceramic or the like. In short, it may be made of any material which is hardly deformed when exposed to an external force so as to prevent mutual contact between the two glass sheets.

<5> The glass sheet 1 is not limited to the planar glass sheet, but 25 may be a curved glass sheet.

INDUSTRIAL APPLICABILITY

The glass panel P may be used for a variety of applications. For example, they may be used for buildings, vehicles (windowpane of automobile, windowpane of railway cars, windowpane of ship), instrument components (surface glass of a plasma display, door or wall of a refrigerator, door or wall of a heat reserving device).

What is claimed is:

1. A glass panel comprising spacing members and a pair of glass sheets, said spacing members being interposed between the pair of glass sheets and a heat-fusible outer periphery sealing portion being provided along the entire outer periphery of the two glass sheets for sealing the space (V) between the glass sheets under a pressure-reduced condition;

wherein a linear expansion coefficient ($\alpha_1$) of one of the glass sheets and a linear expansion coefficient ($\alpha_2$) of the other glass sheet are set within a range which satisfies the following relationship; namely, $$(\alpha_1 - \alpha_2) \times \Delta T \leq 6 \times 10^{-5} \tag{1}$$

where $\alpha_1 > \alpha_2$ $\alpha_1$: the linear heat expansion coefficient of one glass sheet (/° C.)

$\alpha_2$: the linear heat expansion coefficient of the other glass sheet (/° C.)

$\Delta T$: (solidification temperature of the outer periphery sealing portion minus normal temperature of 20° C.

2. A glass panel comprising spacing members and a pair of glass sheets, said spacing members being interposed between the pair of glass sheets and a heat-fusible outer periphery sealing portion being provided along the entire outer periphery of the two glass sheets for sealing the space (V) between the glass sheets under a pressure-reduced condition;

wherein a linear expansion coefficient ($\alpha_1$) of one of the glass sheets and a linear expansion coefficient ($\alpha_2$) of the other glass sheet are set within a range which satisfies the following relationship; namely, $$\{(\alpha_1 \times L_1 - \alpha_2 \times L_2) \times \Delta T\}/L_1 \leq 6 \times 10^{-5} \tag{2}$$

where $\alpha_1 > \alpha_2$ $\alpha_1$: the linear heat expansion coefficient of one glass sheet (/° C.)

$\alpha_2$: the linear heat expansion coefficient of the other glass sheet (/° C.)

$L_1$: the length of the one glass sheet (m)

$L_2$: the length of the other glass sheet (m)

$\Delta T$: (solidification temperature of the outer periphery sealing portion minus normal temperature of 20° C.

* * * * *